United States Patent [19]

Wagner

[11] 4,400,450
[45] Aug. 23, 1983

[54] BATTERY VENT

[75] Inventor: Franz M. Wagner, Lansdale, Pa.

[73] Assignee: Allied Corporation, Toledo, Ohio

[21] Appl. No.: 286,795

[22] Filed: Jul. 27, 1981

[51] Int. Cl.³ ............................................. H01M 2/12
[52] U.S. Cl. .......................................... 429/86; 429/89
[58] Field of Search ........................ 429/86, 89, 82, 83, 429/72, 87, 88, 53, 80, 84

[56] References Cited

U.S. PATENT DOCUMENTS 3,497,104  2/1970  White .................................... 429/82

Primary Examiner—Donald L. Walton
Assistant Examiner—Stephen J. Kalafut
Attorney, Agent, or Firm—James P. DeClercq

[57] ABSTRACT

An explosion-proof battery vent and filler plug (10) is disclosed, which provides a flame barrier (16) to prevent external ignition of gas evolved from a battery during operation from causing ignition of the larger volume of gas within the battery itself, without simultaneously allowing a high rate of evaporation of the electrolyte. In accordance with the invention, the flame barrier means (16) is provided with an indirect, restricted outlet (64) for the evolved gases to pass to the atmosphere, thus reducing the flow of air through the electrolyte space of the battery. The preferred embodiment includes a filler tube (14) with a funnel-shaped entrance (24) within a shell member (12) which sealingly engages an opening of a battery. Gas evolved from the battery during operation passes into a splash chamber, (46) then through a baffle (18) into an expansion chamber 52, and then flows through a microporous disk flame barrier (16) into an exit chamber, (65), and vents to the atmosphere through vent holes (64) which are substantially smaller than any previous passage through which the gas has passed, thus forming an indirect, a restricted outlet for battery gases, and a restricted inlet for air flow to limit the rate of evaporation of electrolyte.

8 Claims, 4 Drawing Figures

BATTERY VENT

BACKGROUND OF THE INVENTION

The present invention relates to storage batteries, and more particularly to an explosion-proof battery vent and filler plug for stationary batteries.

In conventional storage batteries, the filling opening allows oxygen and hydrogen gases which form during the charging of the battery to escape from the battery. If this happens in the presence of a flame or spark, the hydrogen may be ignited, with the flame propagating back into the battery casing, causing explosion of the battery, which not only demolishes the battery and renders it incapable of further use, but may also cause severe personal injuries from the battery acid thrown about by the explosion. Also, the making of hydrometer tests to determine the state of charge of a battery may cause static electricity, resulting in a spark as the hydrometer enters the filling opening of the battery.

There have been various attempts to overcome these difficulties of conventional batteries. One such attempt is shown in U.S. Pat. No. 2,471,585, dated May 31, 1949, entitled "EXPLOSION-PROOF BATTERY VENT AND FILLER PLUG". There, the outer periphery of the filler plug is an annular screen made of a porous ceramic material, to provide a large area and low flow rate of escaping gases. A similar device is shown in U.S. Pat. No. 3,630,788, dated Dec. 28, 1971, entitled "VENTING AND FILLING DEVICE FOR STORAGE BATTERIES." There, two concentric, telescoping porous outer walls, generally tubular in shape, are shown, the outer wall telescoping over the inner wall to allow the positioning of a filling device to allow its use as a device for controlling the electrolyte level of a battery during filling.

These devices share a common deficiency. The provision of a large, porous escape area for gases evolved from the battery plates also provides a large escape area for fluid evaporating from the battery. The resulting need for frequent addition of water is a serious disadvantage, particularly in stationary batteries, which are designed for long-term stand-by use for emergency power supply, or for power leveling by utility companies, or for use with photovoltaic systems for powering unattended weather data collection instrumentation and unattended microwave radio repeater stations, particularly in sunny climates, where such systems are most desirable, but which also have high ambient temperatures. The resulting rate of evaporation at the least causes the necessity for the addition of water at intervals more frequently than desired, and may result in an insufficient electrolyte level, causing damage to the battery plate assembly if maintenance is omitted, or if a higher ambient temperature than usual causes an unanticipated rate of evaporation. Such damage may also result from temperatures caused by battery operation at a higher self-induced temperature than anticipated, such as when more frequent usage than anticipated is necessary. Such increased usage can be caused by, for instance, a series of clouds passing over a photovoltaic power supply, fewer sunny days than anticipated, or, in utility power leveling, hotter or cooler weather than anticipated, causing increased electrical use from increased use of heating or cooling devices.

As will be apparent, unexpected rates of electrolyte evaporation at such times may cause substantial and expensive damage to a large number of battery cells connected in a high-voltage, high current battery bank, causing at the very least a decrease in battery bank capacity and life.

SUMMARY OF THE INVENTION

It has been found desirable to provide an improved storage battery which overcomes the deficiencies of prior attempts to provide vents for battery openings. Such a storage battery should be entirely safe when making hydrometer tests, or when the filling opening is exposed to a spark or flame. Such a storage battery should include provisions for venting gas from the battery in a manner which diffuses the escaping gas so as to prevent burning or explosion when exposed to a spark or flame. To accomplish this objective, it is desirable to provide such a battery with a novel, removable filler plug which need not be removed for filling and testing the battery, which provides for venting escaping gas and diffusing it into the atmosphere such that ignition of the gas will not propagate to the interior of the battery, and which will restrict the rate of evaporation of battery electrolyte to allow longer periods between maintenance, and prevent battery damage from low electrolyte level when the battery temperature is unexpectedly raised, either due to ambient temperatures, or due to use.

Accordingly, it is an object of the invention to provide a battery vent plug, to provide a storage battery which is not subject to explosion due to external ignition of evolved gases, without allowing a high rate of evaporation of battery electrolyte. It is a feature of the invention that evolved gases are vented to the atmosphere through openings which are substantially smaller than the surface area of the explosion proofing means, and substantially smaller than the area of other apertures which may be provided between the interior of the battery and the flame barrier of the vent cap.

It is a further object of the invention to provide a battery vent cap which allows the filling and checking of a battery cell without removing the cap. It is a feature of the invention that the battery vent according to the invention includes a shell portion, and a cover portion in a single assembly. It is an advantage of the invention that nothing need be removed to add water to the battery electrolyte, to determine battery temperature with a thermometer, or to make a hydrometer check of the specific gravity of battery electrolyte.

DESCRIPTION OF THE PREFERRED EMBODIMENT

Figure 1:
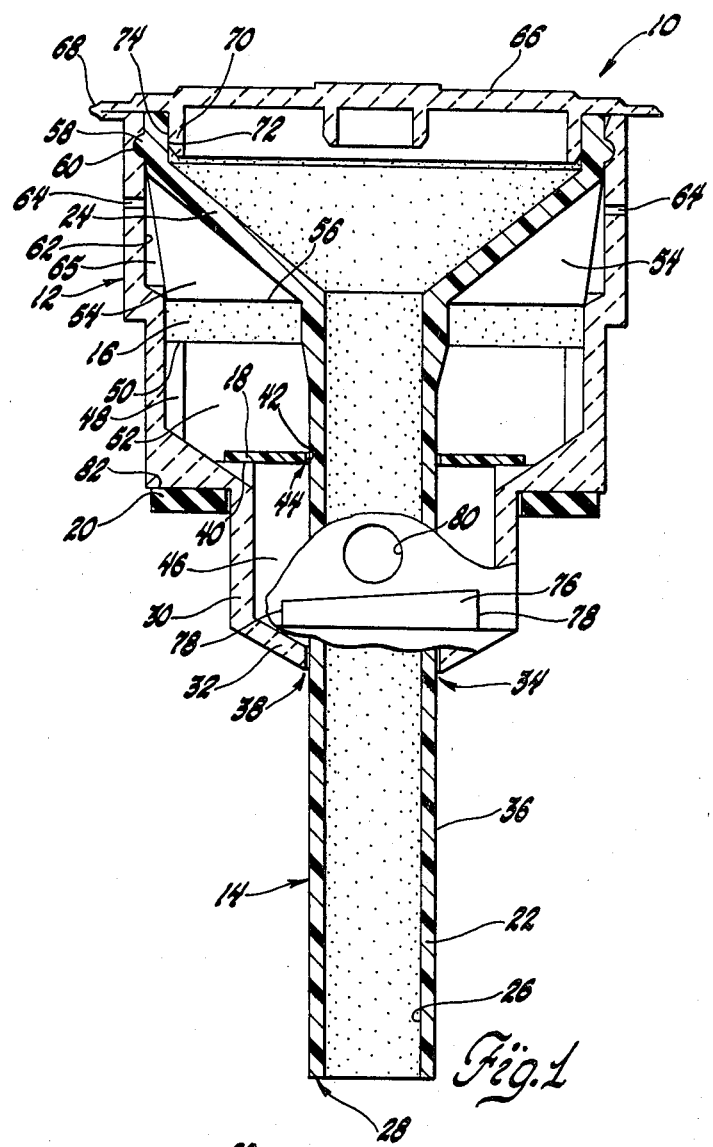
FIG. 1 is a side elevational view, partially in section, of a battery vent plug according to the invention.

FIG. 1 shows a battery vent plug 10 according to the invention. As shown, battery vent plug 10 comprises a shell portion 12, a fill tube portion 14, a flame barrier member, here shown as a microporous disc 16, a baffle 18, and a gasket 20.

Fill tube portion 14 includes a tubular portion 22 and a funnel portion 24. Preferably, tubular portion 22 has an inside diameter 26 to accommodate the insertion of a thermometer or hydrometer for temperature and specific gravity readings, and for the addition of water, funnel portion 24 facilitating the addition of water or insertion of instruments. Also, tubular portion 22 has a length chosen so that end 28 of tubular portion 22 will be below the minimum operating level of electrolyte of a battery provided with vent plug 10.

As shown, shell portion 12 is in the form of a stepped cylinder, having a reduced diameter portion 30 with an end portion 32 defining an opening 34 of substantially the same diameter as outside diameter 36 of tubular portion 22, and including a plurality of passages 38 formed about the periphery of opening 34 for allowing the flow of evolved gases between outside diameter 36 and end portion 32. It will be apparent that opening 34 could also be made larger than outside diameter 36, to form an annular opening in place of separate passages 38, if desired. End portion 32 also is sloped to serve as a drain-back funnel for electrolyte separating from the mist formed by evolving gas bubbles.

Shell portion 12 includes a plurality of supporting bosses 40 supporting annular baffle 18. As shown, baffle 18 is formed with an inside diameter 42 chosen to be slightly larger than outside diameter 36 of tubular portion 22, for allowing the flow of evolved gases through the annular opening 44 formed between inside diameter 42 and outside diameter 36 of tubular portion 22, as well as between supporting bosses 40, while substantially preventing the passage of electrolyte through these openings. Baffle 18 and end portion 32 define a splash chamber 46.

Shell portion 12 also includes a plurality of support portions 48, forming a plurality of shoulders 50 for supporting microporous flame barrier disc 16. Disc 16 and baffle 18 define an expansion chamber 52 between shell portion 12 and tubular portion 22 of fill tube portion 14. As shown, funnel portion 24 is formed with a plurality of generally triangular protrusions 54, which, in an assembled battery vent plug 10, bear upon microporous disc 16 and retain microporous disc 16 between surfaces 56 of protrusions 54 and shoulders 50 of support portions 48. Funnel portion 24 includes, adjacent its entrance, an annular protrusion 58, which cooperates with an annular depression 60 defined by the inside surface 62 of shell portion 12, so that funnel portion 24, and fill tube portion 14, may be assembled to shell portion 12 simply by snapping annular protrusion 58 into annular depression 60. It should be noted that the preferred material for fill tube portion 14 and shell portion 12 is a resilient plastic, resistant to battery electrolyte.

A plurality of vent holes 64 are provided between inside surface 62 and the exterior of shell portion 12, between annular depression 60 and microporous disk 16, for allowing the escape of evolved gases from exit chamber 65 to the ambient atmosphere, while preventing substantial evaporation, partially by preventing air circulation, which removes evolved water vapor, and allows the evaporation of more water by reducing the partial pressure of water vapor of the electrolyte surface. In the preferred embodiment, there are two such holes spaced 180° apart, each having a diameter of 0.020 inches (0.051 cm). This yields an area of 0.00063 in$^2$ (0.004 cm$^2$). This is a considerably smaller area than that of other restrictions in the path of escaping gasses. In a device constructed in accordance with the invention, passages 38 have a combined area of 0.0226 sq.in. (0.146 cm$^2$), openings into chamber 52 have an area of 0.028 in$^2$ (0.182 cm$^2$), and openings 80, below, have a combined area of 0.0565 in$^2$ (0.365 cm$^2$).

In the preferred embodiment of the invention, a cap member 66 is integrally formed with shell portion 12, and integrally hinged to the remainder of shell portion 12 at integral hinge 68. As will be seen, cap member 66 has an annular protrusion 70 with an outer diameter 72 of substantially the same diameter as the inside diameter of entrance portion 74 of funnel portion 24, for frictionally retaining cap portion 66 in a closed position with respect to the remainder of shell portion 12, protecting the opening of funnel portion 24 from the entry of dust and dirt. As will be apparent, cap member 66 may be pivoted about integral hinge 68 to allow access to the interior of the body through tubular portion 22 of fill tube portion 14.

For retaining battery vent plug 10 within an opening of a battery, a catch portion 76 is provided on the exterior of reduced diameter portion 30. As shown, catch portion 76 is in the form of an interrupted thread which may mate with other interrupted threads in the interior of an opening in a battery, for allowing evolved gases to flow past ends 78 of catch portion 76. In the case of a catch portion 76 being an interrupted thread, at least one aperture 80 is formed from the exterior into chamber 46, for allowing the passage of evolved gases into chamber 46. In the preferred embodiment, there are two apertures 80.

As will be apparent, the assembly of a battery vent plug according to the invention is extremely simple. As shown, baffle 18 may be adhesively attached to ledge portion 40, or, alternatively, tubular portion 22 may be provided with a plurality of projections similar to those shown as projections 54, for entrapping baffle 18 between those projections and shoulders 40, and eliminating the use of adhesive to retain baffle 18. Then, microporous disc, 16 is placed on shoulders 50, and fill tube portion 14 is snapped into position inside shell portion 12. Gasket 20 may be loose, or may be adhesively attached to surface 82, adjacent reduced diameter portion 30. It will also be apparent that, if desired, cap member 66 could be provided as a separate member, rather as a part of shell portion 12.

When battery vent plug 10 is installed in an opening of a battery, hydrogen and oxygen gases evolved during charge of the battery, as well as electrolyte splashed by the bubbling of the evolved gases, may enter chamber 44, either through passages 38, or through aperture 80, and will not be vented directly to the atmosphere due to the sealing effect of gasket 20. In chamber 46, this liquid gas mixture is allowed to expand, the majority of the splashed electrolyte draining back to the interior of the battery through passages 38. From chamber 46, the evolved gases pass into expansion chamber 52 through annular opening 44 and openings between supporting bosses. The evolved gases pass through microporous disc 16. Microporous disc 16 may be a porous plastic, a porous ceramic or any other suitable material, preferably having good heat transfer characteristics. In the preferred embodiment, microporous disk 16 is a plastic disk. From microporous disk 16, the evolved gases pass to exit chamber 65 and then to the ambient atmosphere through vent holes 64. If hydrogen and oxygen gases being vented through vent holes 64 should be ignited exterior to vent plug 10, the burning flame front will propagate back towards vent holes 64. Vent holes 64, being relatively small, may be adequate to cool the advancing flame front below the ignition temperature, and prevent the entrance of the flame front through vent holes 64. However, if vent holes 64 do not stop the advancing flame front, the advancing flame front will be stopped by microporous disk 16, microporous disk 16 having a very large effective surface area, in part due to its porosity, and having therefore a very large heat transfer area, cooling the advancing flame front below the ignition temperature, and preventing it from reaching the greater quantity of gases on the interior of the battery.

In the case of a spark formed by static electricity while inserting a hydrometer or thermometer into fill tube portion 14, any resulting explosion would be confined to the volume of gas found within tubular portion 22 and funnel portion 24, since end 28 of tubular portion 22 will be below the level of the electrolyte in the battery, preventing the passage of the advancing flame front to the greater volume of gas within the battery.

Figure 2:
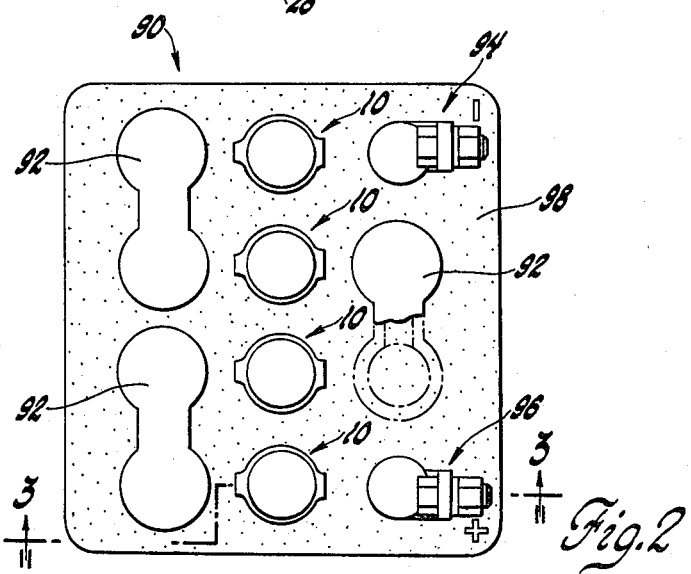
FIG. 2 is a top plan view of a battery provided with the plurality of vent plugs according to the invention.
Figure 3:
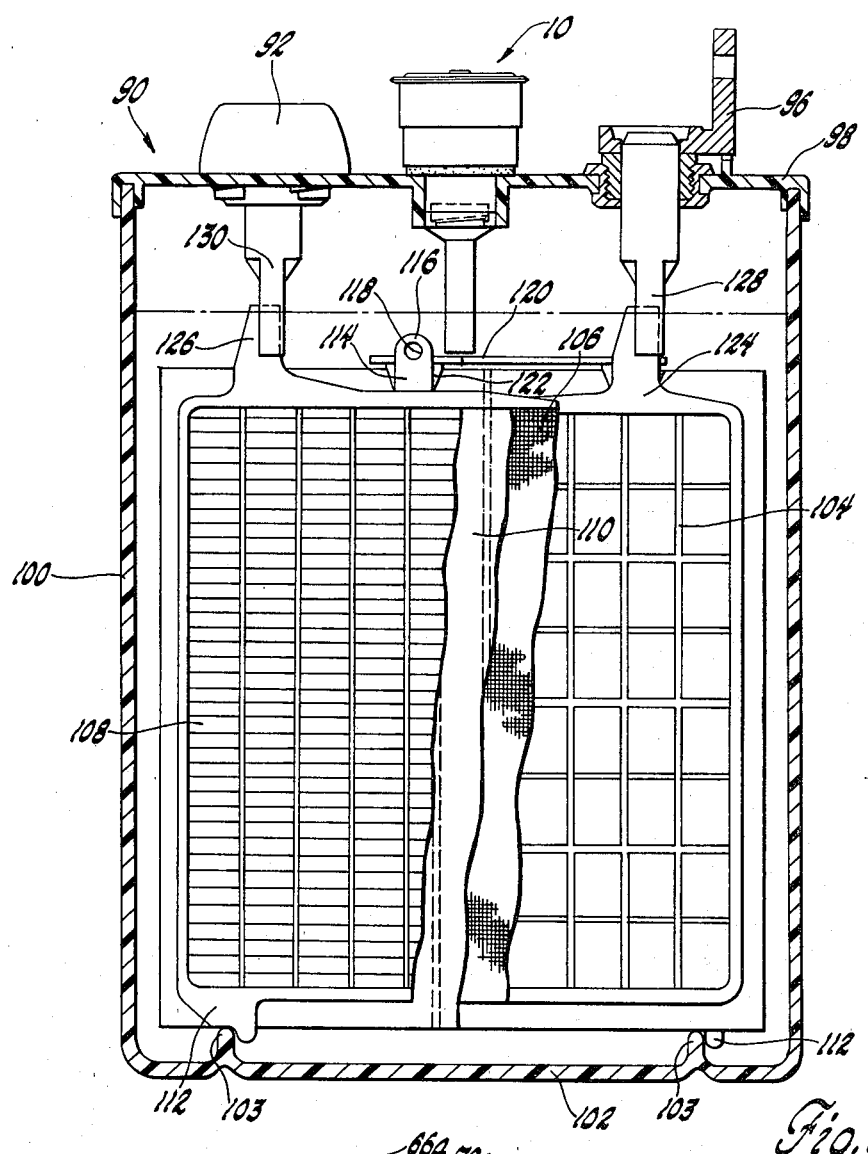
FIG. 3 is a side elevational view, partially in section, of a battery provided with vent plugs according to the invention, taken along line 3—3 in FIG. 2.

Referring to FIGS. 2 and 3, a battery for use with the preferred embodiment of the invention is shown. In FIG. 2, a battery 90 having four battery vent plugs 10 is shown. As shown, there are three intercell connecting straps 92 and negative and positive terminal assemblies 94 and 96, respectively protrude from top 98 of battery 90. In FIG. 3, a side view of battery 90, taken along line 3—3 in FIG. 2, is shown. As shown, battery 90 includes a case having a top 98 and a lower portion 100. The bottom 102 of lower portion 100 includes ribs 103, for aligning battery plates, and for providing a space between the battery plates and the lower portion of the casing for the accumulation of sediment over the life of the battery, so that it will not short out the battery plates. The battery plates are illustrated without the paste material applied to the plate, for clarity. As conventional, the positive plate 104 is wrapped in an envelope 106 of a porous, electrolyte-resistant material, to retain active material, which separates from the body of the plate during the life of the battery, and is separated from negative plate 108 by a ribbed separator 110. This sequence is repeated within a battery cell assembly, the end plates on both ends typically being negative, so that there are more negative plates than positive plates. It will be seen that separator 110 is larger than the outer periphery of either positive plate 104 or negative plate 108, so that growth of a plate over the life of a battery will not cause electrical shorts to occur at the edges of the plate. Separators 110 rest on ridges 103. Also, in the embodiment illustrated, negative plates 108 are provided with protrusions 112 at both lower corners which engage ridges 103 for supporting and aligning negative plates 108. Positive plates 104 are provided with hook protrusions 114, which have apertures 116, through which a rod 118 may be passed. A support member 120 having foot protrusions 122 supports rod 118, and therefore support positive plates 104, allowing positive plates 104 to be spaced away from ridges 103. Foot protrusions 122 are arranged so as to rest on the upper surface of negative plates 108, so that the ribs 103 of the lower portion 100 of the battery 90 supports the negative plates, and the negative plates in turn support the positive plates.

Positive and negative plates 104 and 108, respectively, are provided with tabs 124 and 126, which are welded to connecting straps 128 and 130, respectively. Connecting strap 130 is shown connected to an intercell connecting strap 92, and connecting strap 128 is connected to positive terminal assembly 96, as shown.

Figure 4:
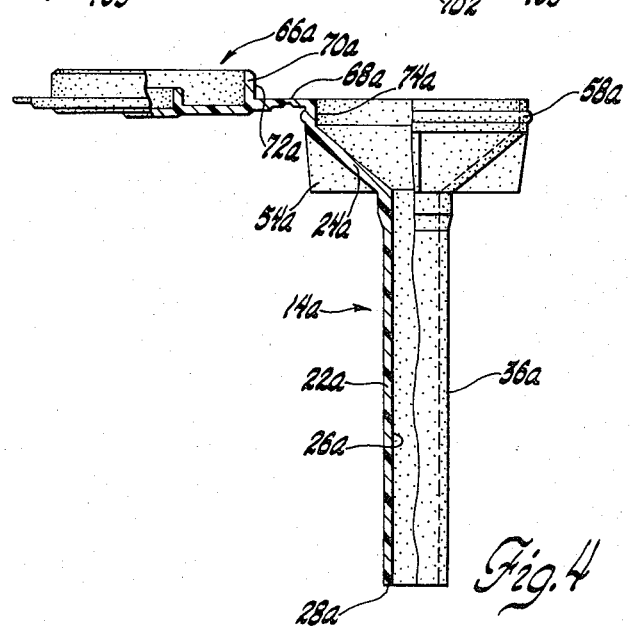
FIG. 4 is a sectional view of a fill tube portion having an integral cap member usable in a vent plug in accordance with the invention.

FIG. 4 shows a fill tube portion 14a having an integral hinged cap member 66a, hinged to the rest of fill tube portion by integral hinge 68a. Since the fill tube portion shown in FIG. 4 is directly interchangeable with that in FIG. 1, identical identifying numbers with a distinguishing suffix "a" are used. Obviously, cap member 66 and hinge 68 as shown in FIG. 1 should be deleted if the fill tube portion 14a is used.

As will be apparent, numerous variations and modifications of the disclosed embodiment of the invention will be obvious to one skilled in the art, and may be easily made without departing from the spirit and scope of the invention.

I claim:

1. A vent plug for a storage battery, comprising:
    a filling tube mounted to enter said battery with its inner end below the level of the electrolyte of said battery;
    said filling tube being formed as a funnel at its outer end;
    a shell portion surrounding a portion of said filling tube including said funnel;
    said shell portion having a portion adapted to be sealably inserted in an opening in said battery, and including means for retaining said vent plug in said battery;
    said shell portion defining a first chamber and a passage communicating between said first chamber and the interior space of said battery;
    a baffle member disposed within said shell portion and defining a boundary between said first chamber and a second chamber, said shell portion defining said second chamber therein, said baffle member further defining a passage communicating between said first chamber and said second chamber;
    a flame barrier member disposed within said shell portion;
    said flame barrier member defining a boundary between said second chamber and a third chamber, said shell portion defining a third chamber therein;
    said flame barrier member being substantially impervious to electrolyte of said battery, and allowing the flow of gases evolved from said battery therethrough;
    said shell portion defining a passage therethrough communicating between said third chamber and the atmosphere for allowing the passage of gas therethrough and forming means for limiting the evaporation of said electrolyte by preventing the circulation of air within said third chamber.

2. A vent plug for a storage battery according to claim 1, wherein:
    said shell portion includes first means for supporting said flame barrier member disposed in said second chamber, said flame barrier member being disposed on said first means, said funnel including means for retaining said flame barrier member between said funnel means and said first means for supporting said flame barrier member.

3. A vent plug for a storage battery according to claim 2, wherein;
    said funnel includes second means for retaining said funnel in said shell portion, said shell portion being provided with third means cooperating with said second means on said funnel for retaining said funnel.

4. A vent plug for a storage battery according to claim 3, wherein:

said shell portion includes a cover member integrally hinged to said shell portion for removably covering said funnel.

5. A vent plug for a storage battery according to claim 3, wherein:

said funnel includes a cover member integrally hinged to said funnel for removably covering said funnel.

6. A vent plug for a storage battery, comprising:

a filling tube mounted to enter said battery with its inner end below the level of the electrolyte;

said filling tube being formed as a funnel at its outer end;

a shell portion surrounding said portion of said filling tube including said funnel;

said shell being generally cylindrical in shape and having a reduced diameter portion adapted to be inserted in said battery, said reduced diameter portion including means for retaining said plug in said battery;

said reduced diameter portion defining a first chamber between said shell portion and said filling tube, and further defining first and second passages;

at least one said first passage being defined between said reduced diameter portion and said filling tube, and at least one second passage being defined through an outer periphery of said reduced diameter portion, said first passage and said second passage being interposed between an interior portion of the battery and said first chamber;

an annular baffle member disposed within said shell portion and defining a third passage between said annular buffer member and said filling tube;

said shell portion and said filling tube defining a second chamber therebetween, said third passage connecting said first chamber and said second chamber;

a microporous disk flame barrier member disposed within said shell portion;

said shell portion and said filling tube defining a third chamber therebetween, said microporous disk flame barrier member separating said second chamber from said third chamber;

an outer wall of said shell portion defining at least one fourth passage therethrough, said fourth passage connecting said third chamber to the atmosphere;

said fourth passage having a substantially smaller area than said third passage and said second passage and said first passage;

said shell portion defining a plurality of first projections in said second chamber for supporting said microporous disk, said microporous disk being disposed on said first projections, said funnel including second projections therefrom, said second projections clampingly retaining said microporous disk;

said vent plug including a cover member integrally hinged to said vent plug for removably covering said funnel;

said funnel including an annular projection;

said shell portion defining an annular depression adjacent said third chamber;

said annular projection and said annular projection cooperating to retain said filling tube in said shell.

7. A vent plug for a storage battery according to claim 6, wherein, said covering member is integrally hinged to said shell portion.

8. A vent plug for a storage battery according to claim 6, wherein:

said cover member is integrally hinged to said funnel.

* * * * *